US00RE39144E

(19) United States
(12) Reissued Patent
Pickard

(10) Patent Number: US RE39,144 E
(45) Date of Reissued Patent: Jun. 27, 2006

(54) REMOTE CONTROL DOOR LOCK SYSTEM

(76) Inventor: Andrew M. Pickard, 2032 Sancerre La., Carrollton, TX (US) 75007

(21) Appl. No.: 10/022,867

(22) Filed: Dec. 14, 2001

Related U.S. Patent Documents

Reissue of:
(64) Patent No.: 6,005,306
Issued: Dec. 21, 1999
Appl. No.: 09/133,937
Filed: Aug. 14, 1998

(51) Int. Cl.
*H01H 35/00* (2006.01)

(52) U.S. Cl. ..... 307/117; 340/825.31; 340/825.72; 307/116; 307/139

(58) Field of Classification Search ..... 307/112, 307/113, 116, 117, 139, 140, 141, 141.8, 307/149; 340/825.71, 825.72, 825.31, 8
See application file for complete search history.

(56) References Cited

U.S. PATENT DOCUMENTS 4,453,161 A * 6/1984 Lemelson ..... 340/825.31
4,573,046 A * 2/1986 Pinnow ..... 340/825.56
4,763,121 A * 8/1988 Tomoda et al. ..... 340/825.54
4,794,268 A * 12/1988 Nakano et al. ..... 307/10.2
4,970,494 A * 11/1990 Keely et al. ..... 340/567
4,996,525 A * 2/1991 Becker, Jr. et al. ..... 340/825.31
5,107,258 A * 4/1992 Soum ..... 340/825.31
5,437,174 A * 8/1995 Aydin ..... 70/278
5,477,213 A * 12/1995 Atarashi ..... 340/825.31
5,490,698 A * 2/1996 Dezso ..... 292/138
5,508,692 A * 4/1996 Wolfram ..... 340/825.31
5,625,349 A * 4/1997 Disbrow et al. ..... 340/825.31
5,638,056 A * 6/1997 Nakashima et al. ... 340/825.71
5,648,764 A * 7/1997 Nose et al. ..... 340/825.32
5,650,774 A * 7/1997 Drori ..... 340/825.32
5,699,685 A * 12/1997 Jahrsetz et al. ..... 70/264
5,729,198 A * 3/1998 Gorman ..... 340/539
5,852,944 A * 12/1998 Collard, Jr. et al. ..... 70/278
5,987,818 A * 11/1999 Dabideen ..... 49/280
5,990,579 A * 11/1999 Ricci ..... 307/117
6,112,563 A * 9/2000 Ramos ..... 70/278.1

OTHER PUBLICATIONS

Brochure, Weiser Lock, Powerbolt Home Access System, © 1997 Masco Building Products Corporation.*
DeMaste, Sarah, "Remote Access Locksets Gain Wider Distribution," National Home Center News, Apr. 27, 1998, pp. 37–38.*

* cited by examiner

*Primary Examiner*—Robert L. DeBeradinis
(74) *Attorney, Agent, or Firm*—Gardere Wynne Sewell LLP

(57) ABSTRACT

A wireless remote control lock system for residential and commercial building pedestrian doors includes an electrically powered striker plate assembly having a striker plate member moveable between positions for engagement and disengagement with a door latch member. The striker assembly is adapted to be connected to a control unit which supplies low voltage DC power to the striker assembly and includes a radio frequency range signal receiver and a circuit responsive to receiving signals from an operator controlled radio transmitter to effect indefinite or momentary operation of the striker assembly to unlock a door. The control unit circuit includes a first self-latching relay, a selector switch and a second relay for selecting an operating mode of the system wherein the door may be unlatched momentarily (for about 3.5 seconds, for example) or indefinitely until a second signal is transmitted by the transmitter to the receiver.

35 Claims, 2 Drawing Sheets

REMOTE CONTROL DOOR LOCK SYSTEM

Matter enclosed in heavy brackets [ ] appears in the original patent but forms no part of this reissue specification; matter printed in italics indicates the additions made by reissue.

FIELD OF THE INVENTION

The present invention pertains to a wireless remote control door lock system, particularly adapted for residential entry and exit doors, for example.

BACKGROUND

The development of wireless remote control locks for motor vehicles and the development of wireless remote controls for operating residential and commercial garage doors has led to substantial improvements in the conveniences and security afforded in everyday life to persons living in both urban and rural settings. However, the improvements realized through the use of wireless remote controlled vehicle door locks and wireless remote control operators for residential and commercial garage doors have not been transferred to or adapted for use with residential entry and exit doors, for example. Accordingly, the conveniences and increased personal security that persons enjoy when entering a motor vehicle or when operating a garage door, for example, have not been available to entry and exit from a person's residence, office or other place of occupancy.

There are many instances when remote control of a pedestrian door is a residence, office or other building entry is desirable. With conventional key locks, for example, it is difficult to lock or unlock the door in poor lighting conditions. Children and elderly persons often have difficulty in manipulating keys and key operated locks. Moreover, it is often desirable to be able to lock or unlock a door from a distance during inclement weather or when a person's hands are occupied when approaching a door, such as when carrying various articles. Further, it is desirable for security purposes to be able to remotely control locking and unlocking of a door from relatively close proximity to the door. Still further, the development of suitable remotely controllable personnel entry and exit doors for residential as well as commercial buildings has also been at least somewhat retarded by the lack of a suitable system which can be easily retrofitted to existing structures as well as easily fitted to new buildings while such are being constructed.

It is to these ends that the present invention has been developed.

SUMMARY OF THE INVENTION

The present invention provides a wireless remote controlled lock system, particularly adapted for personnel entry and exit doors for residential as well as commercial buildings.

In accordance with one aspect of the present invention a remote control door lock system is provided which utilizes a wireless signal transmitter and receiver combination and which may be easily adapted to buildings during new construction or retrofitted to existing buildings to provide a suitable remotely controllable system.

In accordance with another aspect of the present invention a remote control door lock system has been developed wherein a door latching mechanism may be easily fitted with an electrical power operated striker plate assembly which is connected to a control unit including a wireless signal receiver. In this way, existing doors may be conveniently retrofitted with the remote controlled lock system and doors in newly constructed buildings may also be fitted, conveniently, with the lock system including the power operated striker plate assembly.

The remote controlled lock system of the present invention is also advantageously adapted to be connected to a conventional residential or commercial building AC electric power distribution system. In this regard, the system of the invention includes a control unit including a rectifier for converting AC electrical power to low voltage DC electrical power. The control unit also includes control relay means which provide, in accordance with a signal received by the wireless receiver, for operation of a low voltage DC power operated movable lock striker plate member for momentary unlocking of a door or continuous unlocking of the door, as selected by an operator of the lock system.

The present invention advantageously utilizes commercially available radio frequency range transmitter and receiver devices and wherein the transmitter device may be easily incorporated in a key ring fob or the like and conveniently carried by a person desiring access to a particular door.

Those skilled in the art with further appreciate the features and advantages of the remote controlled door lock system of the present invention together with other superior aspects thereof upon reading the detailed description which follows in conjunction with the drawing.

DETAILED DESCRIPTION OF A PREFERRED EMBODIMENT

Figure 1:
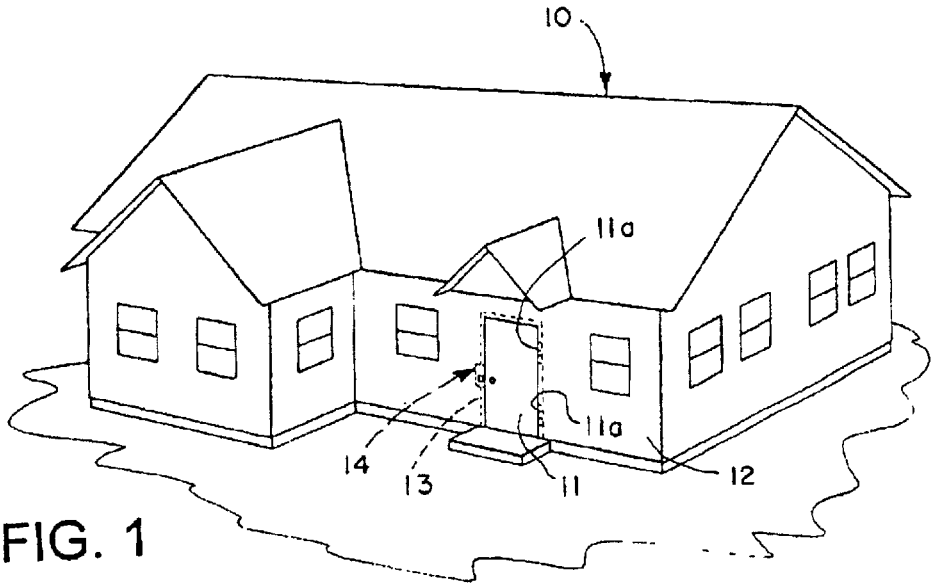
FIG. 1 is a perspective view of a residential structure including a pedestrian entry and exit door which is remotely controllable by the lock system of the present invention.

In the description which follows like parts are marked throughout the specification and drawing with the same reference numerals, respectively. The drawing figures are not necessarily to scale and conventional symbols are used in the schematic diagrams to illustrate certain components.

Figure 2:
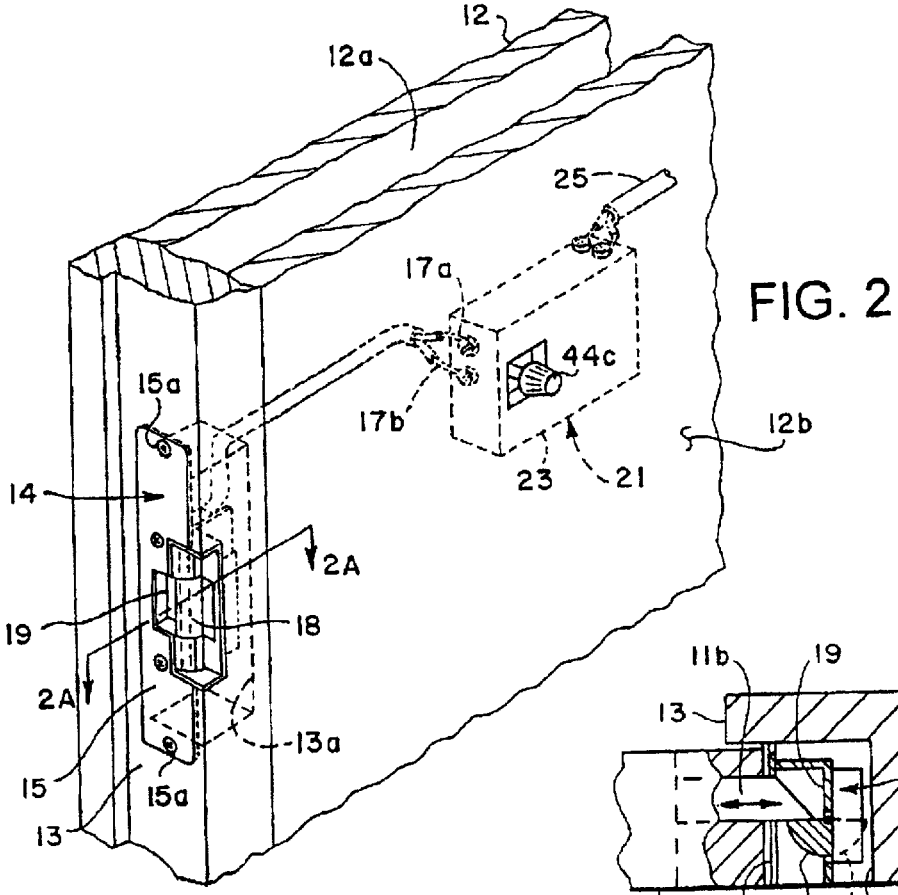
FIG. 2 is a perspective view showing certain features of an electronic striker plate assembly for use with the remote controlled door lock system of the invention.
Figure 2A:
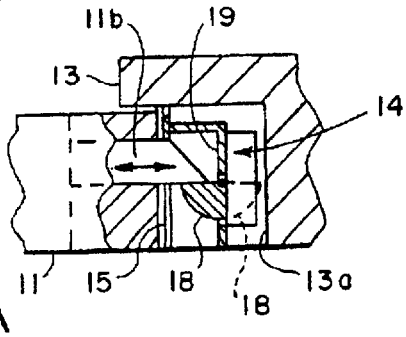
FIG. 2A is a detail section view taken along line 2A—2A of FIG. 2.

Referring to FIGS. 1, 2 and 2A, there is illustrated a typical residential dwelling structure 10 having an inwardly opening pedestrian entry and exit door 11 in a front wall 12 of the structure to provide ingress and egress, at will, by authorized persons. The door 11 is of conventional construction and is supported on hinges 11a for generally horizontal swinging movement between open and closed positions. The structure 10 includes a conventional door jamb 13 which may be formed of wood, plastic or metal and provided with a suitable recess 13a, FIGS. 2 and 2A, in which is fitted a striker plate assembly 14.

Clearly, it is advantageous for persons having authorization to enter and exit the structure 10 to be able to remotely control locking and unlocking of the door 11 for convenience, such as when such persons are carrying various objects, and for personal security reasons. Typically, it is be advantageous to control operation of locking and unlocking the door 11 from a distance of as much as 100 feet to 150 feet away. This distance is within the operating range of certain categories of small, hand-held, battery operated radio frequency transmitter devices. Other wireless signal transmitting and receiving devices, including infrared signal transmitters and receivers and the like are contemplated with respect to transmitter and receiver parts of the lock system of the present invention.

Referring primarily to FIG. 2, there is illustrated a perspective view from the interior of the structure 10 illustrating a support member 15 for the striker plate assembly 14 and which is secured to the door jamb 13 by conventional fasteners 15a. The striker plate assembly 14 may be of a type commercially available, such as from ROFU International Corporation, Tacoma, Wash., as their Electric Door Strike. The striker plate assembly 14 is adapted to mount in a suitable recess 13a in the door jamb 13 of the structure 10, as shown, in place on a conventional door latch striker plate. Referring to FIGS. 2 and 2A, the striker plate assembly 14 includes a latch striker plate member 18 which is moveable between a door latching position shown and a retracted position, shown by the alternate position lines in FIG. 2A, to allow a retractable door latch or bolt member 11b, for the door 11 to move into and out of a recess 19 in the striker plate assembly 14 to allow the door 11 to move between open and closed positions. Preferably, the striker plate assembly 14 is energized to release the striker plate 18 for movement to the open or retracted position and the striker plate 18 is moved to and held in the closed and door latching position shown in FIG. 2 when the striker plate assembly 14 is de-energized. The striker plate member 18 may be operable to be forcibly moved to a position to allow the door 11 to open without retraction of bolt 11b or the striker plate member 18 may just be released to allow the door latch 11b to move the striker plate member 18 to the alternate position shown in FIG. 2A in response to pushing or pulling the door towards its open position. In any case reference herein to movement of the striker plate member 18 to the door release or unlock position may also refer to a condition wherein the member 18 is actually moved by the latch or bolt 11b after being released for such movement.

The striker plate assembly 14 is connected to a control unit 21. FIG. 2, via suitable electrical power conductors 17a and 17b. Moreover, the striker plate assembly 14 is adapted to operate on low voltage DC (direct current) power, to energize the moveable striker plate member 18 to move to the open position. As shown in FIG. 2, the control unit 21 may be provided in a suitable enclosure 23 which may be mounted in a wall cavity 12a for the wall 12 or mounted on the interior surface 12b of the wall in an inconspicuous location and connected to a suitable source of AC (alternating current) electric power, such as conventional 110 volt AC household power, via conductor means 25. A conventional connector or plug 22, see FIG. 3, may be operably connected to the conductor means 25 for control unit 21.

Figure 3:
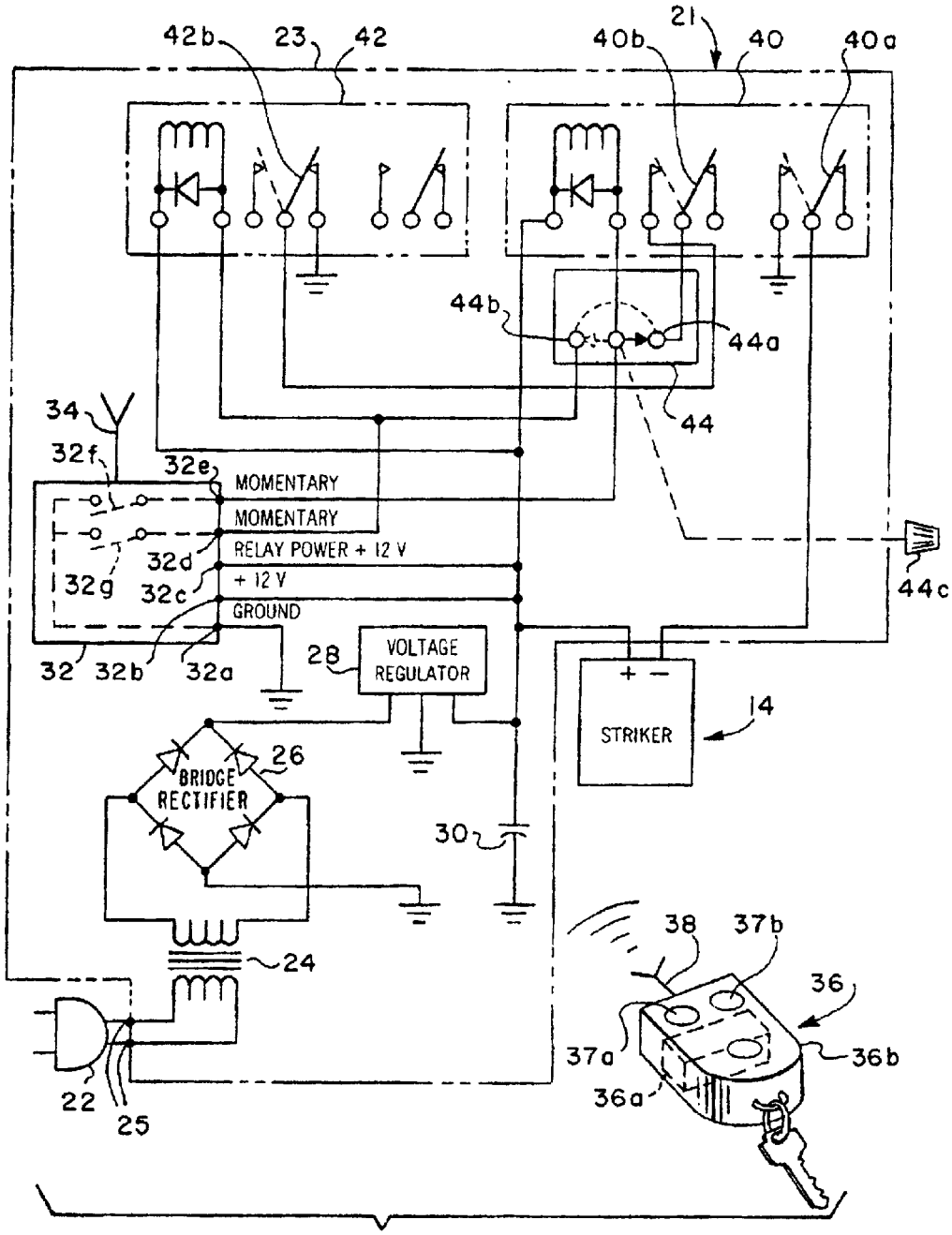
FIG. 3 is a schematic diagram of the door lock system of the present invention.

Referring now to FIG. 3, the control unit 21 is characterized by a suitable power transformer 24 connected to the plug 22 and adapted to reduce conventional 110 volt AC power to the control unit to low voltage AC power, such as a nominal 6.3 volts, for example. A suitable bridge rectifier 26 is provided in the control unit 21 and, is operably connected to the transformer 24 and to a suitable voltage regulator 28. A suitable electrolytic capacitor 30 is also in circuit with the rectifier 26 and the voltage regulator 28 to provide regulated positive twelve volt DC power for all components of the control unit 21 and for the striker plate assembly 14.

Referring further to FIG. 3, the control unit 21 includes a radio frequency range wireless receiver unit 32 disposed therein and having suitable antenna means 34 for receiving a radio frequency range control signal from a transmitter unit 36 comprising a transmitter 36a disposed in a key ring fob 36b or the like, for example. The transmitter unit 36 is also provided with suitable antenna means 38 for emitting radiation in the radio frequency range for reception by the receiver 32. The transmitter unit 36 is preferably provided with at least two momentary push button operated switches 37a and 37b whose operating functions will be explained in further detail herein. The receiver unit 32 and the transmitter unit 36 may both be of a type commercially available and suitable for remote control operation for up to approximately 150 feet operating range between the transmitter and receiver. For example, the receiver and transmitter combination may be of a type manufactured by AAMP of America as their model RXS300 multi-channel receiver module. The transmitter and receiver combination may be operated using only one or both of the transmitter switches 37a or 37b, for example, in accordance with the description herein.

Referring further to FIG. 3, the receiver unit 32 has a power ground terminal 32a, a twelve volt power supply terminal 32b, an internal receiver relay power terminal 32c and terminals 32d and 32e which are connected to respective relays 40 and 42, in circuit with the receiver 32 and the source of DC power, as shown. Still further, the control unit 21 includes a mode selector switch 44 in circuit with relays 40 and 42, as shown, and having two selectable operating positions as indicated by contacts 44a and 44b in FIG. 3. A switch actuator 44c is operably connected to switch 44 for selecting the operating position thereof.

Relay 40 includes two operable contactors 40a and 40b and relay 42 includes one operable contactor 42b. When a suitable signal is transmitted from the transmitter unit 36 to the receiver 32, internal switch means 32f within the receiver and connected to terminal 32e closes momentarily and connects the switch 44 and the relay 40 to ground for a predetermined time period, such as, for example, approximately 3.5 seconds. With terminal 32e effectively connected to ground, current flows through relay 40 causing contactor 40b to move to the alternate position from that shown in FIG. 3 so that current can now continue to flow through the relay 40 by way of switch 44, including switch contact 44a, and contactor 42b of relay 42 which remains in the position shown by the solid line in FIG. 3. Contactor 40a is also moved to the alternate position shown by the alternate position line thereby connecting the electronic striker assembly 14 to ground and unlatching the striker plate member 18, allowing the door 11 to be opened. Since relay 40 is now energized by current flowing through the switch 44, contactor 40b and contactor 42b to ground, relay 40 remains latched in the alternate position even when current is interrupted at terminal 32e.

However, if the transmitter 36 is activated a second time by operation of one of either switch 37a or 37b, internal switch means 32g within the receiver 32 and operably connected to terminal 32d closes momentarily causing relay 42 to move contactor 42b to the alternate position shown in FIG. 3, interrupting current flow through switch 44 in the position shown in FIG. 3, and relay 40. This action causes relay 40 to be de-energized and move contactors 40a and 40b to the solid line positions shown in FIG. 3, thus de-energizing the electronic striker assembly 14 and allowing the striker plate member 18 to move to and remain in the lock or latching position for the door 11.

The alternate position of switch 44 may be selected by a user of the door lock system by operating the switch actuator 44c suitably mounted on the control unit 21. When the receiver 32 receives a signal from the transmitter unit 36, switch means 32f is momentarily closed as mentioned previously, for about 3.5 seconds, for example, energizing relay 40 to move the contactors 40a and 40b to the alternate positions shown in FIG. 3 and energizing the striker assembly 14 to allow the striker 18 to unlock the door. However, since the switch 44 is in the alternate position, the relay 40 will not latch but will remain energized only as long as the switch means 32f is closed.

Accordingly, the door lock system of the present invention provides alternate operating modes wherein a door 11 associated with the lock system may remain unlocked unless commanded to be relocked or the door remains unlocked for only a sufficient amount of time to quickly open the door and exit or enter the building 10 or any structure associated with a door and the door lock system according to the invention.

The installation and operation of the door lock system of the present invention is believed to be readily understandable to those skilled in the art from the foregoing description. The striker assembly 14 may be easily retrofitted to existing door jambs by replacing conventional fixed striker plates with the striker assembly 14 and by connecting the striker assembly to the control unit 21 which may be mounted either within a wall space as illustrated, or on the interior surface thereof. In either case it is convenient to place the enclosure 23 in such a position that access to the actuator 44c for the switch 44 may be easily obtained to select the working position of the switch and control unit 21. The transmitter unit 36 may include additional operating controls, not shown, such as controls for operating a garage door opener or controls for locking and unlocking the doors of a motor vehicle. Moreover, the transmitter unit 36 and the receiver 32 may be adapted to provide for a so-called rolling transmission code to prevent unauthorized operation of the control unit by a person gaining access to the code transmitted by the transmitter unit 36 at any one transmission event.

Although a preferred embodiment of the invention has been described in detail herein those skilled in the art will recognize that various substitutions and modifications may be made to the lock system disclosed without departing from the scope and spirit of the appended claims.

What is claimed is:

1. A wireless remote controlled lock system for a pedestrian door for a residential or commercial building wherein said door includes a door jamb adapted to support a striker plate co-operable with said door for latching said door in a closed and locked position, said lock system comprising:

a striker assembly adapted to mount on said jamb and including a striker plate member moveable between a first position to allow said door to open and a second position for locking said door in a closed position;

a control unit including a wireless signal receiver and circuit means for causing said striker assembly to move said striker plate member to said first position at least momentarily;

a wireless transmitter operable to transmit a signal to said receiver to effect operation of said striker plate to move between said first and second positions;

said circuit means includes circuit elements operable upon receiving a first signal by said receiver from said transmitter to cause said striker assembly to move said striker plate member to said first position and upon receiving a second signal from said transmitter by said receiver to cause said striker plate member to move to said second position; and said circuit elements include a first relay operably connected to a source of electrical power and said striker assembly and responsive to a first signal from said receiver to energize said striker assembly to move said striker plate member to said first position and said first relay includes a latching contactor operably connected to said circuit means for holding said first relay in a latched position to energize said striker assembly.

2. The lock system set forth in claim 1 including:

a second relay in said circuit means and comprising one of said circuit elements and operably connected to said first relay and to said receiver, said second relay being responsive to a signal from said receiver to effect unlatching of said first relay for operation to de-energize said striker assembly.

3. The lock system set forth in claim 2 including:

a mode selector switch interconnecting said first relay with said second relay in such a way that in a first position of said mode selector switch said first relay is self-latching in response to a signal from said transmitter to said receiver.

4. The lock system set forth in claim 3 wherein:

said mode selector switch is operable to be in a second position for causing said first relay to be operable to energize said striker assembly only for a predetermined time period commencing with a signal from said transmitter to said receiver.

5. The lock system set forth in claim 4 including:

an actuator for moving said mode selector switch between first and second positions.

6. The lock system set forth in claim 2 wherein:

said receiver includes first and second switch means for controlling said relays and operable momentarily in response to said receiver receiving a first signal from said transmitter and a second signal from said transmitter, said first and second signals from said transmitter being spaced apart in time.

7. The lock system set forth in claim 1 wherein:

said control unit includes a connector for connecting said control unit to a source of AC electrical power, a transformer operably connected to said connector and a rectifier operably connected to said transformer for converting AC electrical power to DC electrical power for operation of said receiver and said striker assembly.

8. The lock system set forth in claim 7 including:

a voltage regulator interposed in said circuit means between said rectifier and said receiver for regulating DC voltage to said circuit means.

9. The lock system set forth in claim 1 wherein:

said transmitter comprises a radio frequency transmitter and said receiver comprises a radio frequency receiver and said transmitter is disposed in a key ring fob.

10. A remote control lock system for providing wireless remote control of locking and unlocking a pedestrian door in a residential or commercial building, said lock system including:

an electrically powered striker plate assembly, said striker plate assembly including a moveable striker plate member operable to be engageable with a door latch member, said striker plate member being operable in response to a low voltage DC electrical signal to move from a door latching position to a door unlatching position;

a control unit including conductor means adapted to be connected to said striker plate assembly, said control unit including a wireless signal receiver, connector means for connecting said control unit to a source of AC electrical power and rectifier means for converting said AC power to low voltage DC power, said control unit further including a circuit operably connected to said receiver and to said striker assembly and responsive to predetermined signals transmitted to said receiver to cause said striker assembly to effect unlatching a door indefinitely or momentarily;

a wireless transmitter operable to transmit a signal to said receiver to effect one of said indefinite or said momentary unlatching of said door; and a mode selector switch connected to said circuit and operable in a first position to cause said circuit to operate said striker assembly to effect unlatching said door indefinitely in response to a signal transmitted to said receiver, said mode selector switch being operable in a second position to cause said circuit to operate said striker assembly to unlatch said door momentarily in response to a signal transmitted to said receiver.

11. The lock system set forth in claim 10 wherein:

said circuit includes means operable upon said receiver receiving a first signal from said transmitter to cause said striker assembly to move said striker plate member to a first position and upon said receiver receiving a second signal from said transmitter to cause said striker plate member to move to a second position.

12. The lock system set forth in claim 11 wherein:

said circuit includes a first relay operably connected to a source of electrical power and said striker assembly and responsive to a signal from said transmitter to said receiver to energize said striker assembly to move said striker plate member to said first position and said first relay includes a latching contactor operably connected to said circuit for holding said first relay in a latched position to energize said striker assembly.

13. The lock system set forth in claim 12 including:

a second relay in said circuit and operably connected to said first relay and to said receiver, said second relay being responsive to a signal from said transmitter to said receiver to effect unlatching of said first relay for operation to de-energize said striker assembly.

14. The lock system set forth in claim 13 wherein: said mode selector switch interconnects said first relay with said second relay in such a way that in a first position of said mode selector switch said first relay is self-latching.

15. The lock system set forth in claim 14 including:

an actuator for moving said mode selector switch between said first and second positions.

16. A wireless remote controlled door lock system for a doorway for a residential or commercial building wherein said doorway includes a door jamb for supporting a striker plate assembly co-operable with a door for latching said door in a closed position, said lock system comprising:

a striker assembly adapted to mount in a recess in said door jamb and including a striker plate member moveable between a first position to allow said door to open without actuating a latch bolt of said door and a second position for locking said door in a closed position;

control means including a wireless signal receiver operably connected to a circuit for causing said striker assembly to move said striker plate member to said first position at least momentarily;

a wireless transmitter operable to transmit signals to said receiver to effect operation of said striker plate member to move between said first and second positions;

a first relay in said circuit operably connected to a source of electrical power and said striker assembly and responsive to a signal from said transmitter to said receiver to energize said striker assembly to move said striker plate member to said first position, said first relay including a latching contactor operably connected to said circuit for holding said first relay in a latched position to energize said striker assembly; and a second relay in said circuit and operably connected to said first relay and to said receiver, said second relay being responsive to a signal from said transmitter to said receiver to effect unlatching of said first relay for operation to de-energize said striker assembly.

17. The lock system set forth in claim 16 including:

a mode selector switch interconnecting said first relay with said second relay in such a way that in a first position of said mode selector switch said first relay is self-latching.

18. The lock system set forth in claim 17 wherein:

said mode selector switch is operable to be in a second position for causing said first relay to be operable to energize said striker assembly for a predetermined time period only.

19. The lock system set forth in claim 18 including:

an actuator for moving said mode selector switch between said first and second positions.

*20. A wireless remote controlled lock system for a pedestrian door for a residential or commercial building wherein said door includes a door jamb adapted to support a striker plate cooperable with said door for latching said door in a closed and locked position, said lock system comprising:*

*a striker assembly adapted to mount at said jamb and including a striker plate member moveable between a first position to allow said door to open and a second position for locking said door in a closed position;*

*a control unit including a wireless signal receiver and a circuit for causing said striker assembly be energized to provide for movement of said striker plate member to said first position for a predetermined time period;*

*a wireless transmitter operable to transmit a signal to said receiver to effect operation of said striker assembly to provide for movement of said striker plate member to said first position; and*

*a mode selector switch connected to said circuit and operable in a first position to cause said striker plate member to remain in said first position in response to a signal from said transmitter to said receiver, and said mode selector switch is operable to be in a second position for causing said circuit to energize said striker assembly for a predetermined time period commencing with a signal from said transmitter to said receiver.*

*21. The lock system set forth in claim 20 wherein:*

*said circuit includes circuit elements operable upon receiving a first signal by said receiver from said transmitter to cause said striker assembly to provide for movement of said striker plate member to said first position and upon receiving a second signal from said transmitter by said receiver to cause said striker plate member to move to said second position.*

*22. The lock system set forth in claim 21 wherein:*

*said receiver and said circuit are responsive to the time interval between receipt of said first and second signals to determine said predetermined period of time.*

*23. The lock system set forth in claim 20 wherein:*

*said control unit includes a connector for connecting said control unit to a source of AC electrical power, a*

*transformer operably connected to said connector and a rectifier operably connected to said transformer for converting AC electrical power to DC electrical power for operation of said receiver and said striker assembly.*

*24. The lock system set forth in claim 23 including:*

*a voltage regulator interposed in said circuit between said rectifier and said receiver for regulating DC voltage to said circuit means.*

*25. The lock system set forth in claim 20 wherein:*

*said transmitter comprises a radio frequency transmitter and said receiver comprises a radio frequency receiver and said system includes a fob, said transmitter is disposed in said fob and is operable to be carried by a person authorized to operate said lock system.*

*26. The lock system set forth in claim 20 wherein:*

*said receiver and said circuit are responsive to a first signal from said transmitter to energize said striker assembly for said predetermined period of time to provide for movement of said striker plate member to said first position during said predetermined period of time.*

*27. A remote control lock system for providing wireless remote control of locking and unlocking a pedestrian door in a residential or commercial building, said lock system including:*

*an electrically powered striker plate assembly, said striker plate assembly including a moveable striker plate member operable to be engageable with a door latch member, said striker plate member being operable in response to an electrical signal to said striker plate assembly to move from a door latching position to a door unlatching position;*

*a control unit including conductor means connected to said striker plate assembly, said control unit including a wireless signal receiver, connector means for connecting said control unit to a source of electrical power, said control unit further including a circuit operably connected to said receiver and to said striker plate assembly and responsive to a first signal transmitted to said receiver to cause said striker plate assembly to effect unlatching a door, said control unit being responsive to a second signal transmitted to said receiver to cause said striker plate assembly to be operable to latch said door in a closed position, said circuit including a first relay operably connected to a source of electrical power and said striker assembly and responsive to a first signal from said receiver to energize said striker assembly to provide for movement of said striker plate member to said first position and to hold said first relay in a condition to energize said striker assembly; and*

*a wireless transmitter operable to transmit said first and second signals to said receiver.*

*28. The lock system set forth in claim 27 wherein:*

*said control unit includes a connector for connecting said control unit to a source of AC electrical power, a transformer operably connected to said connector and a rectifier operably connected to said transformer for converting AC electrical power to DC electrical power for operation of said receiver and said striker assembly.*

*29. The lock system set forth in claim 28 including:*

*a voltage regulator interposed in said circuit between said rectifier and said receiver for regulating DC voltage to said circuit means.*

*30. The lock system set forth in claim 27 including:*

*a second relay in said circuit and operably connected to said first relay and to said receiver, said second relay being responsive to a second signal from said receiver to effect operation of said first relay to de-energize said striker assembly.*

*31. A wireless remote controlled lock system for a pedestrian door for a residential or commercial building wherein said door includes a door jamb adapted to support a striker plate cooperable with said door for latching said door in a closed and locked position, said lock system comprising:*

*a striker assembly adapted to mount at said jamb and including a striker plate member moveable between a first position to allow said door to open and a second position for locking said door in a closed position;*

*a control unit including a wireless signal receiver and a circuit for causing said striker assembly to provide for movement of said striker plate member to said first position for a predetermined time period, said circuit includes circuit elements operable upon receiving a first signal by said receiver from said transmitter to cause said striker assembly to provide for movement of said striker plate member to said first position and upon receiving a second signal from said transmitter by said receiver to cause said striker plate member to move to said second position, said circuit elements include a first relay operably connected to a source of electrical power and said striker assembly and responsive to a first signal from said receiver to energize said striker assembly to provide for movement of said striker plate member to said first position and to hold said first relay in a condition to energize said striker assembly; and*

*a wireless transmitter operable to transmit a signal to said receiver to effect operation of said striker to provide for movement of said striker plate member to said first position.*

*32. The lock system set forth in claim 31 including:*

*a second relay in said circuit and comprising one of said circuit elements and operably connected to said first relay and to said receiver, said second relay being responsive to a signal from said receiver to effect operation of said first relay to de-energize said striker assembly.*

*33. A wireless remote controlled lock system for a pedestrian door for a residential or commercial building wherein said door includes a door jamb adapted to support a striker plate cooperable with said door for latching said door in a closed and locked position, said lock system comprising:*

*a striker assembly adapted to mount at said jamb and including a striker plate member moveable between a first position to allow said door to open and a second position for locking said door in a closed position;*

*a control unit including a wireless signal receiver and a circuit for causing said striker assembly to provide for movement of said striker plate member to said first position for a predetermined time period;*

*a wireless transmitter operable to transmit a signal to said receiver to effect operation of said striker assembly to provide for movement of said striker plate member to said first position; and*

*said receiver includes first and second switches operable momentarily in response to said receiver receiving a first signal from said transmitter and a second signal from said transmitter, said first and second signals from said transmitter being spaced apart in time.*

*34. A remote control lock system for providing wireless remote control of locking and unlocking a pedestrian door in a residential or commercial building, said lock system including:*

*an electrically powered striker plate assembly, said striker plate assembly including a moveable striker plate member operable to be engageable with a door latch member, said striker plate member being operable in response to an electrical signal to energize said striker plate assembly to move from a door latching position to a door unlatching position;*

*a control unit including conductor means connected to said striker plate assembly, said control unit including a wireless signal receiver, connector means for connecting said control unit to a source of electrical power, said control unit further including a circuit operably connected to said receiver and to said striker plate assembly and responsive to a first signal transmitted to said receiver to cause said striker plate assembly to effect unlatching a door, said control unit being responsive to a second signal transmitted to said receiver to cause said striker plate assembly to be operable to latch said door in a closed position;*

*a wireless transmitter operable to transmit said first and second signals to said receiver; and*

*a mode selector switch connected to said circuit and operable in a first position to cause said striker plate member to remain in said door unlatching position in response to a signal from said transmitter to said receiver, said mode selector switch in operable to be in a second position for causing said circuit to energize said striker plate assembly for a predetermined time period commencing with a signal from said transmitter to said receiver.*

*35. A remote control lock system for providing wireless remote control of locking and unlocking a pedestrian door in a residential or commercial building, said lock system including:*

*an electrically powered striker plate assembly, said striker plate assembly including a moveable striker plate member operable to be engageable with a door latch member, said striker plate member being operable in response to an electrical signal to said striker plate assembly to move from a door latching position to a door unlatching position;*

*a control unit including conductor means connected to said striker plate assembly, said control unit including a wireless signal receiver, connector means for connecting said control unit to a source of electrical power, said control unit further including a circuit operably connected to said receiver and to said striker plate assembly and responsive to a first signal transmitted to said receiver to cause said striker plate assembly to effect unlatching a door, said control unit being responsive to a second signal transmitted to said receiver to cause said striker plate assembly to be operable to latch said door in a closed position;*

*a wireless transmitter operable to transmit said first and second signals to said receiver; and*

*said receiver includes first and second switches operable momentarily in response to said receiver receiving said first signal from said transmitter and said second signal from said transmitter, said first and second signals from said transmitter being spaced apart in time.*

* * * * *